United States Patent Office 3,535,751
Patented Oct. 27, 1970

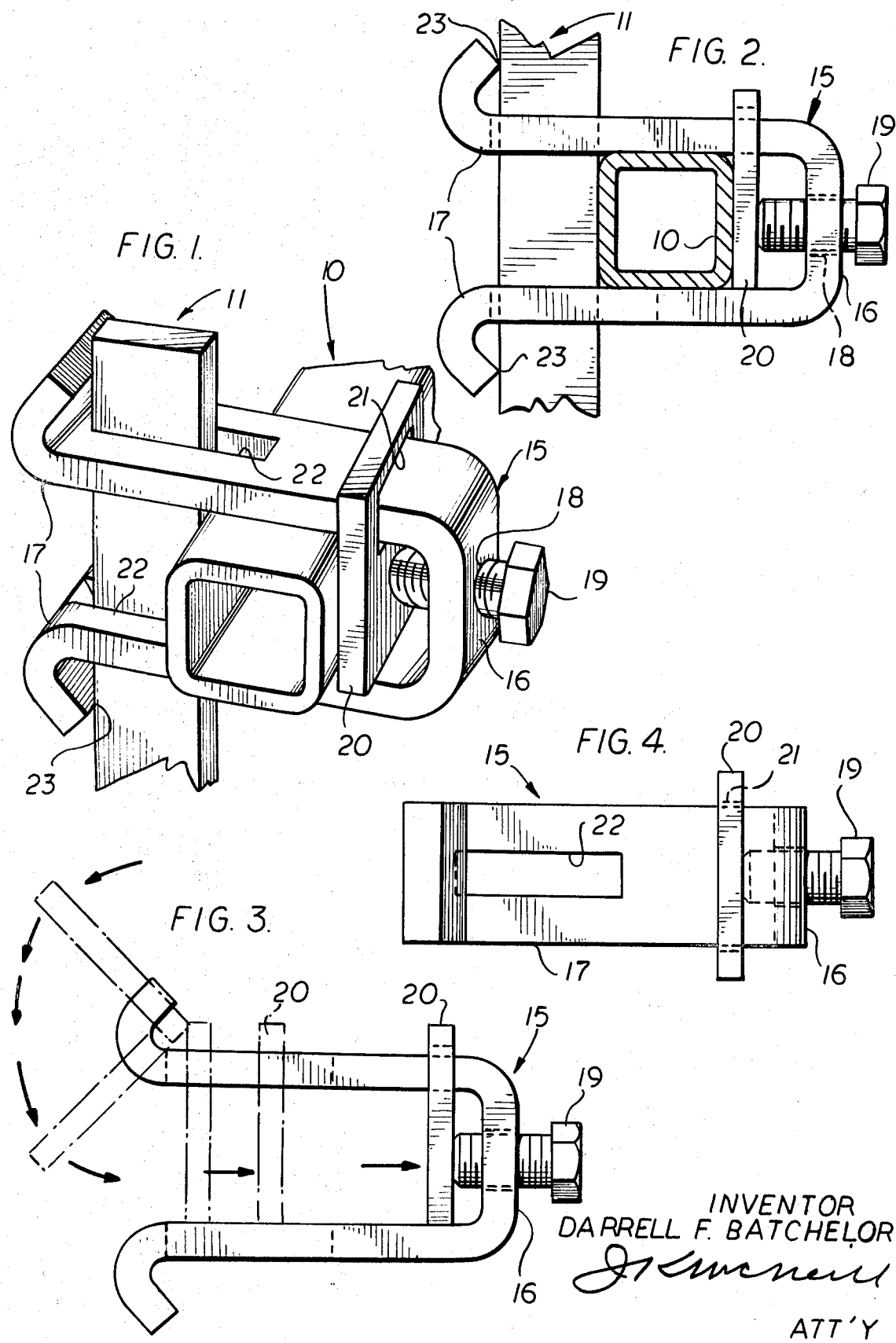

3,535,751
TOOL BAR CLAMP
Darrell F. Batchelor, Citrus Heights, Calif., assignor to International Harvester Company, Chicago, Ill., a corporation of Delaware
Filed Oct. 18, 1968, Ser. No. 768,661
Int. Cl. A01b *15/02*
U.S. Cl. 24—263                                     2 Claims

ABSTRACT OF THE DISCLOSURE

A clamping device for connecting agricultural implements to a hollow tool bar wherein a force exerting element in the form of a setscrew carried by the clamp engages the tool bar, the clamping device including a stiffener plate separably connected to the clamping device and disposable between the bolt and the tool bar to protect the tool bar when the clamping device is tightened.

BACKGROUND OF THE INVENTION

This invention relates to improvements in clamps such as those used for connecting together the parts of an agricultural implement. It is the common practice, in assembling an agricultural implement, to mount an earth working tool on the lower end of a vertical standard which is then secured to a horizontal tool bar for mounting on a supporting frame such as a tractor.

Prior art clamping devices, such as the one fully disclosed in U.S. Pat. 2,743,657 to G. M. Kriegbaum granted on May 1, 1956, are known which will perform the clamping action required; however, the prior clamps had locking bolts or setscrews which were allowed to bear directly on the tool bar wall. This direct contact with the tool bar caused the buckling of the tool bar wall followed by the loosening of the clamp, rotation of the clamp and eventual destruction of the tool bar wall.

SUMMARY OF THE INVENTION

The object of this invention is the provision of an improved tool clamp adapted for connecting a tool standard to a tool bar, causing minimum tool bar wear while providing maximum rigidity and adjustability.

Other objects and advantages of this invention will be apparent to those skilled in the art after referring to the following description and claims taken in conjunction with the accompanying drawings.

DESCRIPTION OF THE DRAWINGS

FIG. 1 is a perspective view of the clamping device showing the relationship of the individual parts when the clamping device has been tightened;

FIG. 2 is a side view of the clamping device with the tool bar shown in cross section;

FIG. 3 is a side view similar to FIG. 2 but with the tool bar removed to illustrate the method of attaching the stiffener plate to the clamping device; and FIG. 4 is a plan view of the clamping device showing the stiffener plate in its working position.

DESCRIPTION OF THE PREFERRED EMBODIMENT

In the following description, front and rear reference is determined by facing the end of the clamp that has the setscrew engaged in it.

Referring to FIGS. 1 and 2, the numeral 10 designates a hollow horizontal tool bar, and 11 a vertically extending tool standard which, in actual operation, would have an earth working tool (not shown) secured at its lower end. The tool bar 10 is of the type that is suspended from a tractor or other support for carrying a plurality of tool standards as the one shown at 11.

To secure these parts together with the front face of the standard 11 engaging the rear face of the tool bar 10, a clamp designated by the numeral 15 is provided. The clamp 15 is U-shaped, having a transverse head section 16 and laterally spaced rearwardly extending arms 17 spaced at approximately the width of the tool bar.

The head 16 of the clamp is provided with a threaded opening 18 adapted to receive the threaded shank of a force-exerting element in the form of a setscrew 19. The end of the setscrew 19 is adapted to engage the forward face of a stiffener plate 20. The stiffener plate 20 has a slot 21 of greater dimensions than one of the rearwardly extending arms 17, to receive the latter, allowing its positioning on one of said arms near the head 16 of the clamp as shown in FIGS. 2 and 4 and preventing the disjunction of the plate 20 from the U-shaped clamp 15. The rear face of the stiffener plate 20 engages the forward face of the tool bar 10 when the setscrew 19 is tightened to secure the parts together.

The rear portions of each of the arms 17 are provided with aligned slots 22 which are elongated and of greater length than the tool standard 11. Preferably the rear end of each of the arms 17 of the clamp is turned in an arc outwardly and toward the head 16 of the clamp and the terminal faces 23 are engageable with the rear face of the tool standard 11.

OPERATION

The operation of the clamping device shown in FIG. 1 can best be understood by referring first to FIG. 3 which illustrates the installation of the stiffener plate 20 on the clamping device 15 by hooking the opening 21 in the stiffener plate 20 over one of the rearwardly extending arms 17 and moving it forward toward the head 16 of the clamp, and preventing the disjunction of the plate 20 from the U-shaped clamp 15. The clamping device 15, including the stiffener plate 20 and setscrew 19, is then slid over the tool bar 10 and the tool standard 11 is introduced into the aligned slots 22. Upon tightening the setscrew 19, the outwardly turned ends 23 of the arms 17 are caused to engage the rear edge of the tool standard 11. Preferably, the front and rear edges of the tool standard 11 do not engage the ends of the slots 22 so that the clamp functions as a spring with respect to the setscrew 19, placing it in tension to maintain its position and prevent it from loosening. The tightening of the setscrew 19 causes it to bear up against the stiffener plate 20 which engages the forward face of the tool bar thereby distributing the force applied to the tool bar 10, by tightening the setscrew 19, over an area greater than the end of the setscrew. The improvement in the clamping device 15 by the addition of the stiffener plate 20 prevents the buckling of the tool bar wall which is usually followed by the subsequent loosening of the clamp, rotation of the clamp and the eventual destruction of the tool bar wall.

What is claimed is:

1. The combination with a clamping device, comprising a U-shaped member having; spaced arms adapted to receive a tool bar therebetween, said arms having a longtitudinal slot therein to receive a tool standard, a transverse head portion, the rear end of each of said arms of said clamping device being turned outwardly and forward toward said transverse head portion and having the terminal faces of said arms engageable with the tool standard, a force-exerting element carried in said head portion and said tool bar, of a plate adapted to be positioned between said element and said tool bar to distribute the force applied to the tool bar by said element, said plate has at least one slot formed therein, said slot being of greater dimensions than the cross section of one of the said arms, said plate adapted for movement over the rear end of at least one of the said arms and being positioned between said force exerting element and said tool bar.

2. The invention as set forth in claim 1 wherein the dimensions of said plate are substantially equal to the internal transverse distance between said arms.

References Cited

UNITED STATES PATENTS

| | | | |
|---|---|---|---|
| 1,019,343 | 3/1912 | Moore et al. | |
| 1,262,489 | 4/1918 | Hawk | 24—263.3 |
| 1,749,637 | 3/1930 | Kingston | 24—81 XR |
| 2,743,657 | 5/1956 | Kriegbaum | 306—1.5 |
| 2,805,877 | 9/1957 | Ashley | 287—54 |

DONALD A. GRIFFIN, Primary Examiner

U.S. Cl. X.R.

287—54; 306—1.5